United States Patent [19]

Asano et al.

[11] Patent Number: 4,502,931

[45] Date of Patent: Mar. 5, 1985

[54] PROCESS FOR THE PRODUCTION OF ION EXCHANGE MEMBRANES WITH COATING FOR ELECTROLYSIS

[75] Inventors: Hiroshi Asano, Chiba; Takayuki Shimamune, Tokyo; Kazuhiro Hirao, Kanagawa, all of Japan

[73] Assignee: Permelec Electrode Ltd., Kanagawa, Japan

[21] Appl. No.: 483,014

[22] Filed: Apr. 7, 1983

[30] Foreign Application Priority Data

Apr. 9, 1982 [JP] Japan .................................. 57-58197

[51] Int. Cl.³ .......................... C23C 15/00; C25B 13/00
[52] U.S. Cl. .......................... 204/192 C; 204/192 SP; 204/192 E; 204/296; 427/40; 427/122; 427/126.3
[58] Field of Search ............. 204/296, 192 C, 192 SP, 204/192 D, 192 E; 427/34, 122, 126.3, 40, 307, 322

[56] References Cited

U.S. PATENT DOCUMENTS

| | | | |
|---|---|---|---|
| 4,253,922 | 3/1981 | Welch | 204/128 |
| 4,272,353 | 6/1981 | Lawrance | 204/296 |
| 4,323,434 | 6/1982 | Yoshida | 204/296 |
| 4,328,086 | 5/1982 | Takenaka | 204/296 |
| 4,349,422 | 9/1982 | Maloney | 204/296 |

Primary Examiner—John F. Niebling
Attorney, Agent, or Firm—Sughrue, Mion, Zinn, Macpeak, and Seas

[57] ABSTRACT

A process for the production of electrolytic ion exchange membranes with a coating, comprising coarsening the surface of an ion exchange membrane by an ion-etching treatment and, thereafter, coating the coarsened surface with a substance with a low electrochemical activity. The use of these ion exchange membranes greatly reduces the electrolytic voltage while maintaining a high current efficiency, and enables electrolysis to be performed in a stable manner over a long period of time.

3 Claims, 1 Drawing Figure

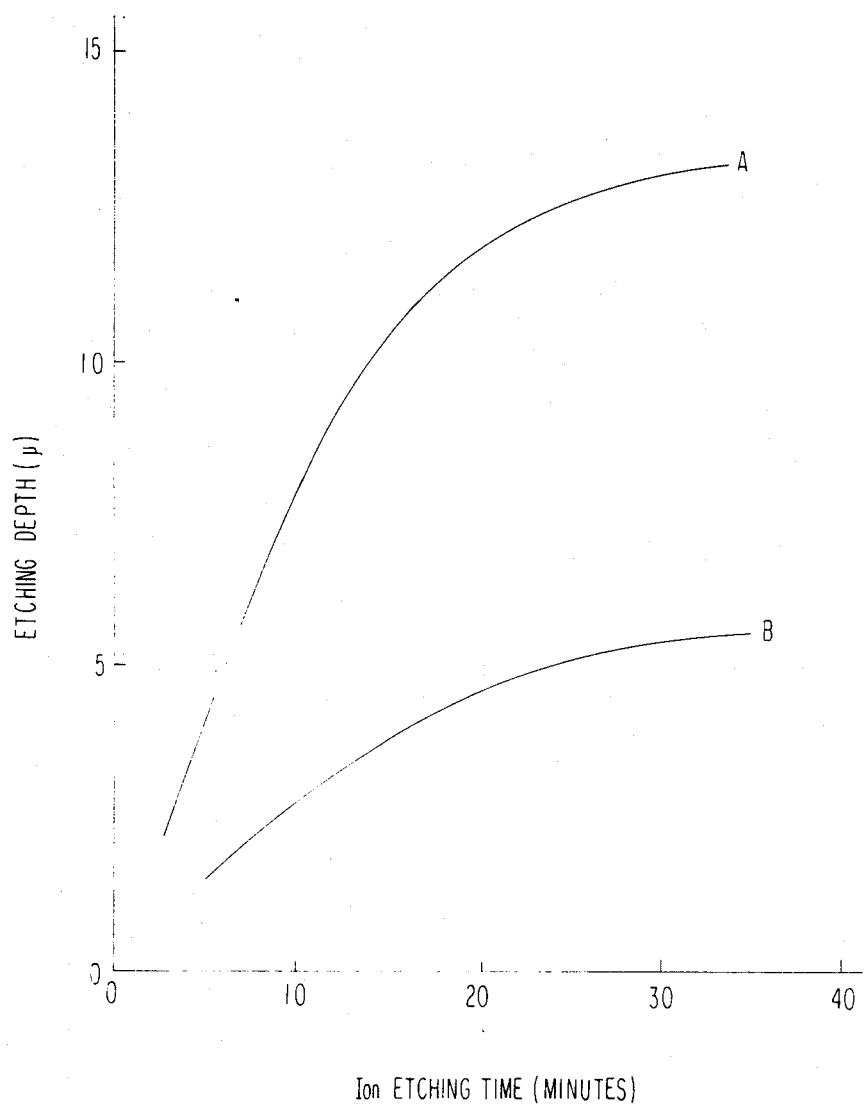

PROCESS FOR THE PRODUCTION OF ION EXCHANGE MEMBRANES WITH COATING FOR ELECTROLYSIS

FIELD OF THE INVENTION

The present invention relates to a process for the production of ion exchange membranes with a coating for use in the electrolysis of, for example, an aqueous alkali halide solution by an ion exchange membrane process.

BACKGROUND OF THE INVENTION

In electrolysis of an aqueous alkali halide solution, particularly sodium chloride, reduction of electrolytic voltage has been an important technical subject from the viewpoint of energy-saving and so forth.

The electrolytic voltage is represented by the sum of voltage increments due to elements present between the anode and the cathode, constituting an electrolytic cell. Thus, a reduction of electrolytic voltage can be attained by analyzing each constitutive element and reducing the voltage arising as a result of its presence. In electrolysis by an ion exchange membrane process, main constitutive elements which may be reduced in terms of voltage increments include electrode overvoltage, liquid resistance between electrodes, membrane resistance, and unevenness of current distribution in the membrane.

Recently, various techiques have been proposed according to the so-called SPE electrolytic process utilizing an electrolytic cell in which electrode catalytic substances are held directly on solid electrolytic membranes (see, for example, Japanese Patent Application (OPI) Nos. 102278/78, corresponding to U.S. Pat. No. 4,197,178; 93690/79, corresponding to U.S. Pat. Nos. 4,210,501 and 4,224,121; and 107493/79, corresponding to U.S. Pat. No. 4,191,618). (The term "OPI" as used herein means a "published unexamined Japanese patent application".) This process is superior particularly in that since there is no electrolytic solution between the electrodes, the generated increase of voltage due to the effect of gas bubbles mainly responsible for the liquid resistance can be substantially eliminated, and it is said to greatly solve the above-described subject. However, many technical problems arise in applying the process to industrial scale electrolysis requiring a large-sized membrane.

In order to overcome these problems, Japanese Patent Application (OPI) No. 93883/81 (corresponding to published European Patent Application No. 0031660) discloses an improved SPE electrolytic process utilizing a newly-developed electrolytic cell in which an electrode member prepared by coating a gas permeable, electrically conductive substrate with a porous electrode catalyst layer is brought into close contact with the surface of a solid electrolytic membrane, and furthermore, a coating layer of low activity substance is provided between the membrane and the electrode catalyst layer to decrease the electrolytic membrane, and furthermore, a coating layer of low activity substance is provided between the membrane and the electrode catalyst layer to decrease the electrolytic voltage and improve the electrolytic performance. Similar techniques of decreasing the electrolytic voltage by providing a layer of an inert substance between the ion exchange membrane and electrode are disclosed in Japanese Patent Application (OPI) Nos. 112487/81 and 23076/82.

However, the effect of decreasing electrolytic voltage to be attained only by providing these low activity substance layers on an ion exchange membrane is still insufficient. It has further been revealed that in operating an electrolytic cell for long periods of time, the voltage increased gradually, and it is therefore difficult to perform a low voltage operation in a stable manner over long periods of time.

SUMMARY OF THE INVENTION

An object of this invention is to provide a process for the production of electrolytic ion exchánge membranes with a coating, which decrease the electrolytic voltage and permit stable electrolytic operation for a long period of time.

The present invention provides a process for the production of electrolytic ion exchange membranes with a coating which comprises ion-etching the surface of the ion exchange membrane to coarsen the surface and, thereafter, coating the thus-coarsened surface with a substance or substances with a low electrochemical activity, e.g., carbon, graphite, platinum, tin oxide, titanium oxide, tantalum oxide, and a mixture thereof.

BRIEF DESCRIPTION OF THE DRAWING

The FIGURE is a graph showing the relationship between ion-etching time and etching depth.

DETAILED DESCRIPTION OF THE INVENTION

Ion exchange membranes which can be used herein are not limited, and any known electrolytic ion exchange membrane, e.g., made of a fluorine-containing resin, can be used. For example, conventional cation or anion exchange membranes as disclosed in, for example, U.S. Pat. No. 3,341,366 and 3,442,285, can be used.

Japanese Patent Application (OPI) No. 116891/81, discloses that electrolytic voltage can be decreased by coarsening the surface of an ion exchange membrane, improving the passage of air bubbles generated therethrough. In this invention, the effect by coating of the above-described substance(s) with low activity and the effect by application of the above-described surface-coarsening can be achieved in combination. These surface-coarsening and coating treatments can be applied to either of the cathode or anode sides, and to both the cathode and anode sides of the ion exchange membrane.

A number of surface-coarsening methods are known as described in Japanese Patent Application (OPI) No. 116891/81. Of these methods, an ion-etching process is most suitable in the invention. A wet process using an etching solution is very complicated procedurally. In accordance with the sand blast process, which is a dry process and convenient to conduct, it is difficult to produce an evenly coarsened surface, and blast material particles used may remain as impurities on the coarsened surface, deteriorating the adhesion of the coarsened surface to a layer of the substance with a low activity and interferring with the electrolytic operation.

Ion-etching is one of the dry processes, is easy to conduct, and permits easy production of a uniformly and finely coarsened surface. Furthermore, since the thus-coarsened surface is free from retained impurities, its adhesion properties to inert substances to be coated thereon later are good.

This ion-etching treatment can be performed using various known devices, a low temperature plasma flow irradiation device, a sputtering device utilizing a corona discharge, and an ion beam sputtering device. These techniques are well known in the art, for example, plasma flow irradiation and sputtering are described in J. R. Hall et al., "Effect of Activated Gas Plasma Treatment Time on Adhesive Bondability of Polymers", *Journal of Applied Polymer Science*, Vol. 16, pp. 1465-1477 (1972). Preferred are those devices in which the heat generated by electrode discharge can be sufficiently removed, which are less influenced by radiation heat, or which produce high ion energy that increases the etching rate and provides high efficiency. Gas sources which can be introduced into such devices include argon, nitrogen, and oxygen. They can be used alone or in combination with each other. Usually, argon is suitable for use. Ion-etching conditions are not critical and can be appropriately determined depending on the properties of the ion exchange membrane to be treated and the device to be used. For example, in the case of an ion beam sputtering device using an ion gun, suitably the acceleration voltage is about 500 to 1,500 V, the current density on the irradiation surface is from about 0.01 to 0.5 mA/cm$^2$, and the processing time is from about 1 to 60 minutes.

The FIGURE shows the relationship between ion beam irradiation conditions and the etching depth for a commercially available electrolytic ion exchange membrane. In the drawing, A indicates the etching depth when the etching is performed at an acceleration voltage of 1 KV and a current density of 0.05 mA/cm$^2$, and B, the etching depth when the etching is performed at an acceleration voltage of 0.6 KV and a current density of 0.025 mA/cm$^2$. The etching depth greatly changes with variations in ion acceleration voltage. Even if irradiation is performed longer than a certain period, the etching depth does not increase any more beyond a certain limit.

The effects of the invention can be sufficiently obtained by controlling the etching depth to from about 0.1 to 20$\mu$ and preferably from 3 to 10$\mu$.

Ion exchange membranes whose surface has been coarsened by ion-etching are then coated with a substance or substances with low electrochemical activity.

For this coating, although any technique can be used as long as it can provide a sufficiently high adhesion strength and a uniform coating, such as hot pressing, chemical vapor deposition (CVD), vacuum sputtering, etc., it is most suitable to use a vacuum sputtering method which produces a high adhesion strength and enables a uniform coating thickness to be easily controlled. Furthermore, since a device provided with both the functions of an ion-etching treatment and a coating treatment by vacuum sputtering can be used, the efficiency of the process of the invention can be increased.

In a sputtering device, particles of a coating substance emitting from a target, the particles being to form a coating layer, are in a high energy state and strongly adhere to the coarsened surface obtained by ion-etching, in the state where they are interlocked with the surface. This coating treatment makes the surface of the ion exchange membrane more hydrophilic, accelerating the release of adsorbed gas and improving the passage of gas released from the ion exchange membrane. Thus, a surface condition that reduces the increase of voltage due to the effect of air bubbles effect can be obtained. Accordingly, the coating substances must have low electrochemical activity and have corrosion resistance, and furthermore, must have a hydrophilic nature or gas releasing properties sufficient to exhibit the above-described function.

Typical examples of coating substances which can be used as substances to be applied to the coarsened surface on the anode side include carbon, graphite, platinum, tin oxide, titanium oxide, and tantalum oxide and as those substances to be applied to the coarsened surface on the cathode side, include carbon, graphite, tin oxides, etc. These substances can be used alone or in combination with each other. The thickness of the coating substance layer (calculated as the thickness of the coating layer with a smooth surface) is sufficient if between about 0.05 and 5$\mu$.

As a gas source to be introduced into the sputtering device, various gases generally used can be used. It is usually suitable to use argon. In producing an oxide coating layer, oxygen, in a proportion of from about 5 to 50% by volume, is preferably mixed with the gas. The degree of vacuum in the apparatus is from about $10^{-6}$ to 10 Torr and preferably from about $10^{-5}$ to $10^{-3}$ Torr.

The present invention is described in greater detail by reference to the following examples and comparative examples although the invention is not to be construed as being limited thereto.

EXAMPLE 1

A cation exchange membrane, (Nafion 315, trade name for a perfluoro cation exchange membrane, manufactured by E. I. du Pont de Nemours & Co.), having a thickness of about 0.4 mm and, cut to a disk of a diameter of 80 mm was placed in an ion beam sputtering device in such a manner that the cathode side surface was positioned at the target point. The peripheral portion of the membrane was masked, and only the central portion (diameter, 40 mm) was subjected to argon ion beam irradiation. Ion-etching was performed for 15 minutes under the following conditions: ion beam acceleration voltage, 600 V; ion current density at irradiated portion, 0.05 mA/cm$^2$; and degree of vacuum, $10^{-3}$ Torr. After the treatment, the irradiated area of the membrane became turbid, and was coarsened.

The thus-treated membrane was then replaced by a graphite plate, and was moved to a location where it was to be irradiated with particles emitted from the sputtering target. In this way, sputter coating of the coarsened surface with graphite was performed. This sputter coating was performed for 30 minutes under the following conditions: ion beam acceleration voltage, 3.0 KV; ion current density at central portion of target, 0.1 mA/cm$^2$; and degree of vacuum, $10^{-4}$ Torr.

The cross-section of the ion exchange membrane with the coating layer was examined using a scanning type electron microscope (SEM). This electron microscopic analysis showed that the etching depth was about 4$\mu$, the thickness of the graphite coating layer was about 0.1$\mu$, both the etching layer and the coating layer were uniform in thickness, and the coating layer was firmly adhered to the etching layer.

EXAMPLE 2

The procedures of Example 1 were repeated except that the ion exchange membrane was subjected to etching and coating of graphite at both sides.

EXAMPLE 3

The procedures of Example 1 were repeated except that the ion exchange membrane was subjected to ion-etching and coating at both sides, and as coating substances, graphite was used at the cathode side and platinum at the anode side.

Electrolytic testing was performed to examine the performance of each ion exchange membrane as prepared above. The results are shown in Table 1 below together with those of comparative examples.

This electrolytic testing was performed as follows:

As electrolytes, an aqueous solution of NaCl (250 g of NaCl dissolved in one liter of water) was used at the anode side, and a 20% by weight NaOH solution was used at the cathode side. The temperature was about 80° C., and the current density was 30 A/dm$^2$. As the cathode, nickel mesh was used, and as the anode, titanium mesh with ruthenium oxide coated thereon was used. The anode was brought in close contact with the membrane, and the distance between the electrodes was 2 mm.

The membrane of Comparative Example 1 was the same cation exchange membrane as in Example 1 except that it was not subjected to the surface treatment. The membrane of Comparative Example 2 was the same as in Example 1 except that both sides were coarsened only by a shot blast treatment using alumina grit. The membrane of Comparative Example 3 was the same as in Example 1 except that both sides were subjected to the ion etching treatment, but not to any coating treatment.

| | Electrolytic Performance Testing Results | | | |
|---|---|---|---|---|
| | Just after Start of Electrolysis | | 30 Days after Start of Electrolysis | |
| Run No. | Electrolytic Voltage (V) | Current Efficiency (%) | Electrolytic Voltage (V) | Current Efficiency (%) |
| Example 1 | 3.57 | 86 | 3.56 | 86 |
| Example 2 | 3.51 | 88 | 3.50 | 88 |
| Example 3 | 3.50 | 88 | 3.49 | 88 |
| Comparative Example 1 | 3.75 | 83 | 3.76 | 82 |
| Comparative Example 2 | 3.63 | 82 | 3.68 | 82 |
| Comparative Example 3 | 3.61 | 82 | 3.66 | 81 |

It can be seen from the results in Table 1 that the ion exchange membranes subjected to the ion-etching and coating treatments according to the invention have greatly reduced electrolytic voltage while maintaining high current efficiency and enable electrolysis to be performed in a stable manner over a long period of time in comparison with the ion exchange membranes of the comparative examples.

While the invention has been described in detail and with respect to various embodiments thereof, it is apparent that various changes and modifications may be made therein without departing from the spirit and scope thereof.

We claim:

1. A process for the production of an ion exchange membrane with a coating thereon for use in electrolysis, comprising:
   (1) coarsening the surface of said ion exchange membrane by ion etching so that the etching depth ranges from about 0.1 to 20$\mu$ and,
   (2) thereafter, coating the thus-coarsened surface with a substance selected from the group consisting of carbon, graphite, and tantalum oxide.

2. The process as claimed in claim 1, wherein the thickness, calculated as the smooth surface coating thickness, of the coating of the substance with ranges from about 0.05 to 5$\mu$.

3. The process as claimed in claim 1, wherein the coating of the substance is performed by a vacuum sputter process.

* * * * *